United States Patent [19]

Itou et al.

[11] Patent Number: 5,001,599
[45] Date of Patent: Mar. 19, 1991

[54] GAS-INSULATED SWITCHGEAR APPARATUS

[75] Inventors: Syunji Itou, Hitachi; Hiroshi Suzuyama, Hitachiota; Minoru Sakaguchi, Hitachi, all of Japan

[73] Assignee: Hitachi, Ltd., Tokyo, Japan

[21] Appl. No.: 380,109

[22] Filed: Jul. 14, 1989

[30] Foreign Application Priority Data

Aug. 3, 1988 [JP] Japan .................................. 63-192606

[51] Int. Cl.$^5$ .............................................. H02B 5/00
[52] U.S. Cl. .................................... 361/333; 361/335; 361/341
[58] Field of Search ....................... 200/148 B, 148 R; 361/332–335, 341, 355, 361

[56] References Cited

U.S. PATENT DOCUMENTS

| 4,687,890 | 8/1987 | Yamamoto et al. | 200/148 B |
| 4,744,002 | 5/1988 | Nakano et al. | 361/341 |
| 4,752,860 | 6/1988 | Romanet et al. | 361/341 |

FOREIGN PATENT DOCUMENTS 0183908 9/1985 Japan .
0213205 10/1985 Japan .

Primary Examiner—Gregory D. Thompson
Attorney, Agent, or Firm—Antonelli, Terry, Stout & Kraus

[57] ABSTRACT

A gas-insulated switchgear apparatus has a sealed container including a cylinder body having a substantially circular cross-section and end plates closing the end portions of the cylinder body. The sealed container accommodates breaker portions situated so as to work opening and closing actions in the vertical direction and current transformers. Main bus bars located on the side of the sealed container are connected with the breaker portions located inside of the sealed container through openings formed in the end plates. A line side terminal portion located on the side of the sealed container is connected with the breaker portions locating inside of the sealed container through openings formed in the end plates.

9 Claims, 9 Drawing Sheets

FIG. 12

GAS-INSULATED SWITCHGEAR APPARATUS

BACKGROUND OF THE INVENTION

The present invention relates to a gas-insulated switchgear apparatus, in particular, to a gas-insulated switchgear apparatus having a sealed container in which at least a breaker portion, a current transformer, and an earthing switch for maintenance and inspection are together contained.

In gas-insulated switchgear apparatus of the recent days, a current transformer and an earthing switch for maintenance and inspection are accommodated in a sealed container, which is originally provided for containing a breaker portion, for the purpose of decreasing the mounting area occupied by the apparatus.

A gas-insulated switchgear apparatus of this kind is disclosed in Japanese Patent Unexamined Publication No. 60-213205, where the sealed container has a cylindrical shape with its axis situated substantially horizontally, and contains therein a current transformer together with a breaker portion for working opening and closing actions in a vertical direction. Further, the cylindrical surface of the container, namely the upper or lower portion of the container, is formed thereon with branch nozzles, with which main bus bars are to be connected, and a side surface (end surface) of the container is connected with a line side terminal portion.

In the gas-insulated switchgear apparatus mentioned above, the mounting area for the apparatus may be decreased, but the height of the same becomes rather higher, because branch nozzles are provided on the upper or lower portion of the horizontally situated sealed container for introducing the main bus bars into the container. In addition, there is a problem that it is somewhat difficult in manufacture to form cylindrical branch nozzles on a cylindrical surface of the sealed container. Further, since, at the connecting portions between the sealed container and the branch nozzles, there may be generated a higher electric field concentration on the earthing side, it is required to locate the main bus bars in the container or connecting conductors extending to line side connecting terminals considerably apart from the wall surface of the container for avoiding the high electric field concentration. In consequence, the connecting conductors are formed in complicated bended shapes for assuring sufficient clearances from the wall of the container and from other devices arranged in the container, thereby causing a complex structure inside of the container.

Japanese Patent Unexamined Publication No. 60-183908 discloses a gas-insulated switchgear apparatus of the above-mentioned type, where main bus bars are connected with a side surface of a sealed container. In this gas-insulated switchgear apparatus, the sealed container has as cylindrical shape with its axis situated vertically and contains therein a breaker portion working opening and closing actions in a vertical direction and a current transformer. Further, the cylindrical surface of the container is formed on one side portion thereof with a branch nozzle, with which the main bus bars are connected, and on the other side portion with a branch nozzle, with which the line side terminal portion is connected.

In the gas-insulated switchgear apparatus mentioned above, the height of the apparatus may be decreased, but the mounting area for the same becomes rather greater, because branch nozzles are provided on the side portion of the sealed container. Further, the above-mentioned disadvantages still remain also in this apparatus, because the cylindrical branch nozzles are 0 formed also on the cylindrical surface of the sealed container for connecting main bus bars and line side terminal portion with the container.

Since a gas-insulated switchgear apparatus of this type is generally installed in the inside of a house, small size of the mounting area and the low height of the apparatus are desired.

SUMMARY OF THE INVENTION

The object of the present invention is to provide a gas-insulated switchgear apparatus, wherein the height and the mounting area for the apparatus are both small, the production for the apparatus is easy, and the internal structure of the apparatus is simple.

In the gas-insulated switchgear apparatus according to the present invention, the sealed container includes a cylindrical body and end plates for sealing the both ends of the cylindrical body. In the sealed container are contained breaker portions, which perform opening and closing actions in a substantially vertical direction, and current transformers together. The sealed container is positioned with its axis directing in a horizontal direction. Main bus bars extend to a side or sides of the sealed container, and are connected with the breaker portions through openings formed in the end plate or plates. On a side or sides of the sealed container are arranged line side terminal portions, which are connected with the breaker portions through openings formed in end plates.

The current transformer is disposed around the breaker portion as surrounding the same. Preferably, the current transformer on the main bus bar side is positioned with its upper end located at the substantially same height as the height of the moving contactor of the breaker portion in an open circuit condition of the breaker, while the current transformer on the line side is positioned with its lower end located at the substantially same height as the height of the stationary contactor of the breaker portion.

DESCRIPTION OF THE PREFERRED EMBODIMENTS

Referring to FIGS. 1–4, a gas-insulated switchgear apparatus according to a first embodiment of the present invention will be described hereinafter.

The gas-insulated switchgear apparatus includes a sealed container 1, which is of a cylindrical shape having a substantially elliptical cross-section and is positioned with its axis substantially horizontal. The sealed container 1 includes a cylinder body 1a and end plates 1c, 1d for closing the ends of cylinder 1a, and is filled with arc-extinguishing gas. The end plate 1c is formed with two openings 40a and 40b above and below, through which the switchgear apparatus is connected with two main bus bars 12a and 12b locating on a side of the sealed container. Between the main bus bars 12a, 12b and the end plate 1c is interposed an insulation spacer 36, which insulates the main bus bars from the sealed container 1, and seals the container 1. The end plate 1d is also formed with two openings 40c and 40d above and below. Through the opening 40c, the switchgear apparatus is connected with a line side terminal portion 17. Between the end plate 1d and the line side terminal portion 17 is interposed another insulation spacer 36. The lower opening 40d is a manhole for inspection, and is normally closed by a lid 19. The line side terminal portion 17 includes a sealed chamber 13, line side disconnecting switches 14 disposed in the sealed chamber 13, line side earthing switches 15, and cable heads 16. Three phase current breaker portions 2, working opening and closing actions in a vertical direction, are disposed in the container 1, and supported by insulation cylinders 6 arranged in a branch nozzle portion 1e formed on the lower portion of the cylinder body 1a. The breaker portion 2 is opened or closed by a lower actuator 41 through actuating links extending in the insulation cylinder 6. Around the breaker portion 2 is disposed a main bus bar side current transformer 3a and a line side current transformer 3b as surrounding the breaker portion 2. The lower terminal of the breaker portion 2 is connected with an end of a bus bar side connecting conductor 7, which is divided into several lines and connected with the main bus bars 12a, 12b at the divided ends through the openings 40a, 40b, respectively. The upper terminal of the breaker portion 2 is connected with an end of a line side connecting conductor 8, the other end of which is connected with the line side terminal portion 17 through the opening 40c. Each of the bus bar side connecting conductor 7 and the line side connecting conductor 8 has a part locating in the upper portion of the sealed container 1, on which are mounted a stationary contactor 9a of a bus bar side earthing switch 9 for maintenance and inspection and a stationary contactor 10a of a line side earthing switch 10 for maintenance and inspection, respectively. Moving contactors 9b, 10b located opposite to the stationary contactors 9a, 10a, respectively, are supported by a common supporting plate 11.

Figure 1:
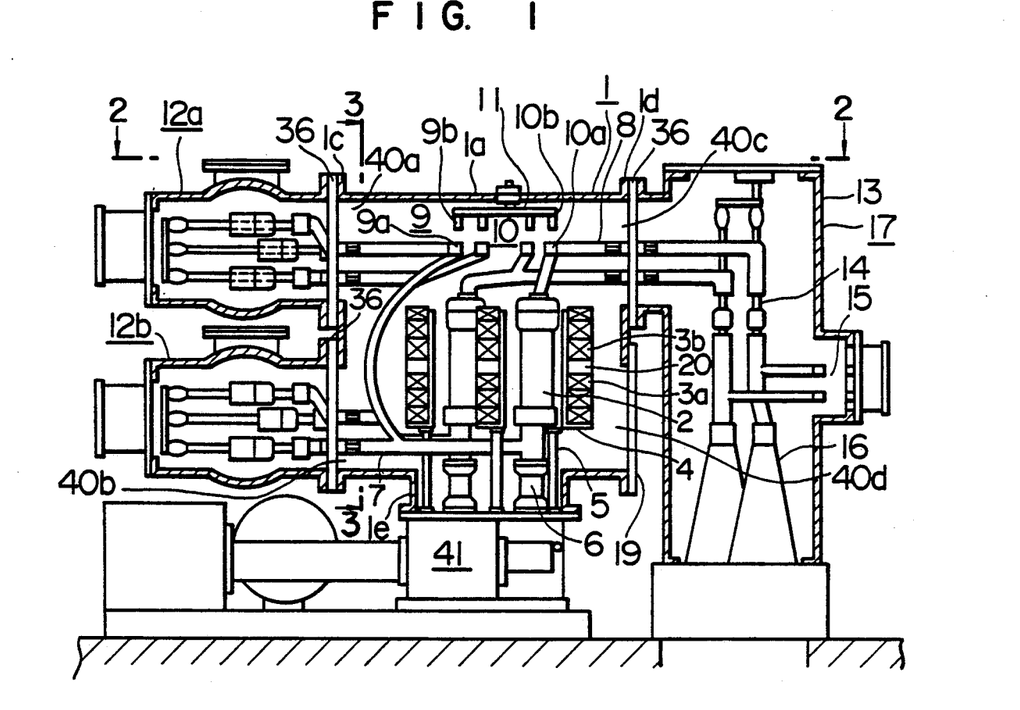
FIG. 1 is a front view of a gas-insulated switchgear apparatus according to a first embodiment of the present invention partially in section at the container portion for showing the internal arrangement.
Figure 2:
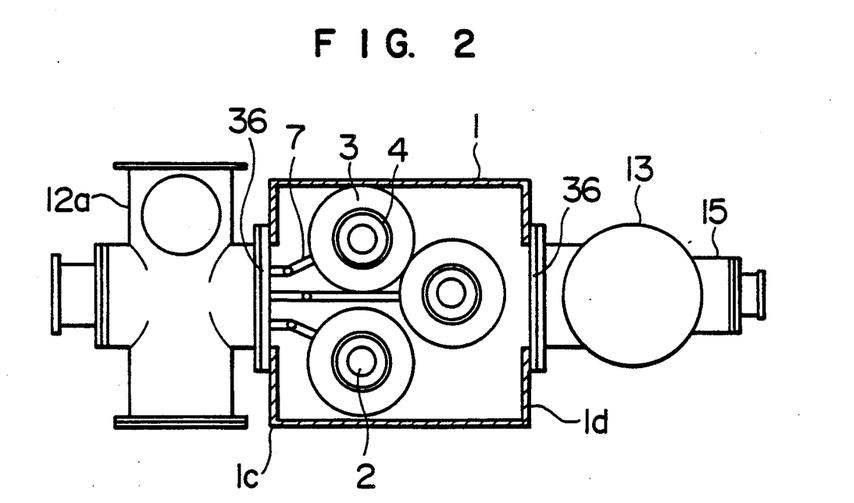
FIG. 2 is a cross-sectional view taken along line II—II of FIG. 1.
Figure 3:
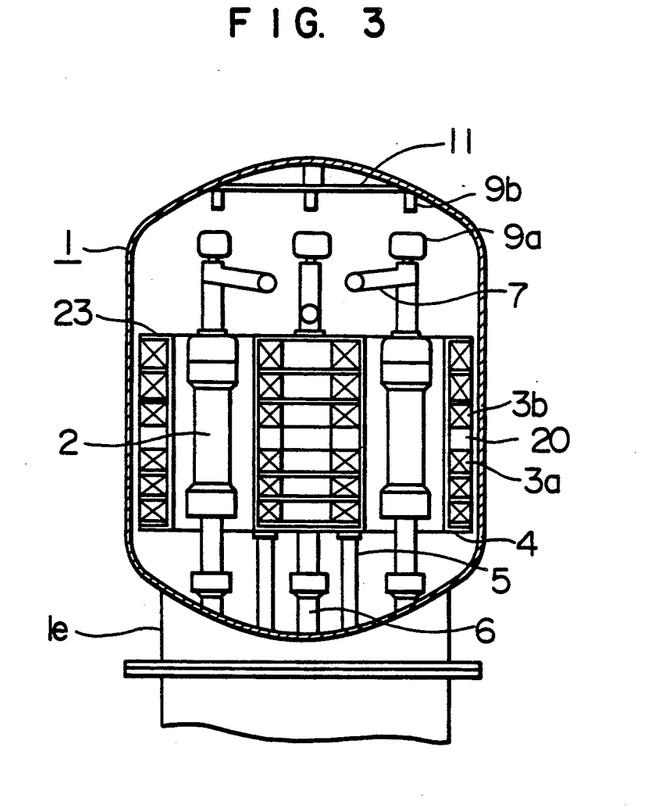
FIG. 3 is a cross-sectional view taken along line III-—III of FIG. 1.
Figure 4:
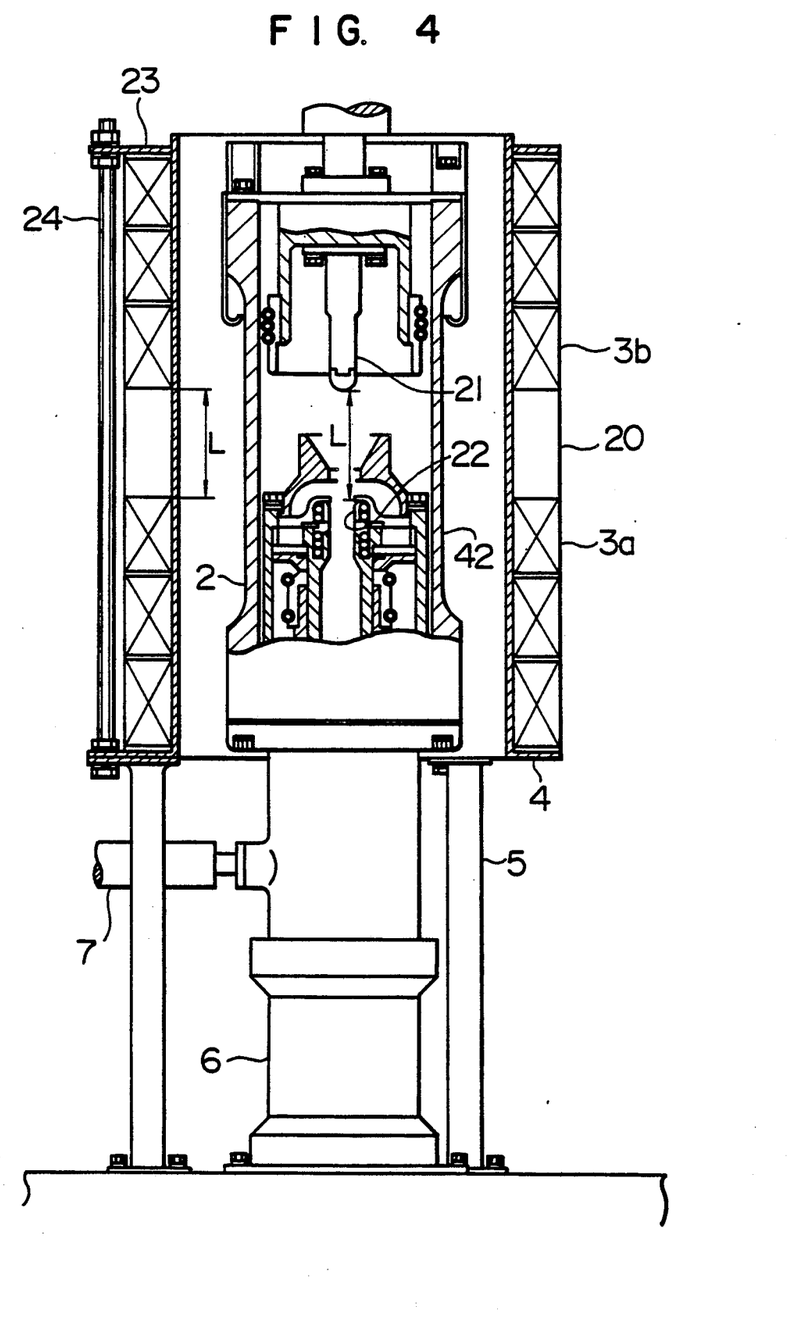
FIG. 4 is a front cross-sectional view of a breaker portion of the gas-insulated switchgear apparatus shown in FIG. 1 partially in section.

FIGS. 3 and 4 show details of the breaker portion 2 and the current transformers 3a, 3b. The breaker portion 2 comprises a stationary contactor 21 and a moving contactor 22 arranged opposite to each other in an insulation cylinder 42. The current transformers 3a, 3b are mounted on a supporting bracket 4 which surrounds the insulation cylinder 42, and are held between a holding plate 23 and the supporting bracket 4 by means of clamping bolts 24. The supporting bracket 4 is secured to the inner wall of sealed container 1 by means of a plurality of fittings 5 located below the bracket 4. The current transformer includes the bus bar side current transformer 3a, a spacer 20 for position adjusting, and the line side current transformer 3b, these members being arranged in this order from below to above with the upper end of the bus bar side current transformer 3a locating as high as a tip of a moving contactor 22 of the breaker portion 2 in an open circuit condition, and with the lower end of the line side current transformer 3b locating as high as a tip of a stationary contactor 21 of the breaker portion 2. The distance between these current transformers 3a and 3b is substantially equal to the distance L between the contactors 21 and 22 in an open circuit condition of the breaker portion 2.

From the above-mentioned embodiment, the following advantages can be obtained.

(1) The height of the switchgear apparatus is decreased, because the main bus bars 12a, 12b are arranged on the side of the sealed container 1.

(2) No branch nozzle is required on the cylindrical surface of the sealed container 1, because the sealed container is laid with its axis substantially horizontal, and the connections of the breaker portion with the main bus bars or the line side terminal portion are carried out through the end plates of the sealed container 1. In consequence, the production of the switchgear apparatus becomes simpler, and the mounting area for the same can be decreased to the amount of disusing any branch nozzle.

(3) The shape of the connecting conductors 7, 8 become simpler, because there is not any branch nozzle which may cause a high electric field concentration on the earthing side.

(4) Both the current transformers 3a and 3b suffer no influence from the hot gas used for extinguishing the arc produced at a switch break instant, because the transformers are arranged around the breaker portion 2 and separated from the same by means of the insulation tube 42.

(5) Because the position of the upper end of the current transformer 3a and the lower end of the current transformer 3b are respectively made to conform with the height of the contactors 21, 22 of the breaker portion 2 in opened condition, all of the accidents except for accidents between contactors 21, 22 exist in either protecting area of the transformers 3a and 3b. Accordingly, it is possible to control the switchgear apparatus so as to suitably separate the accident portion from the normal portion.

Figure 5:
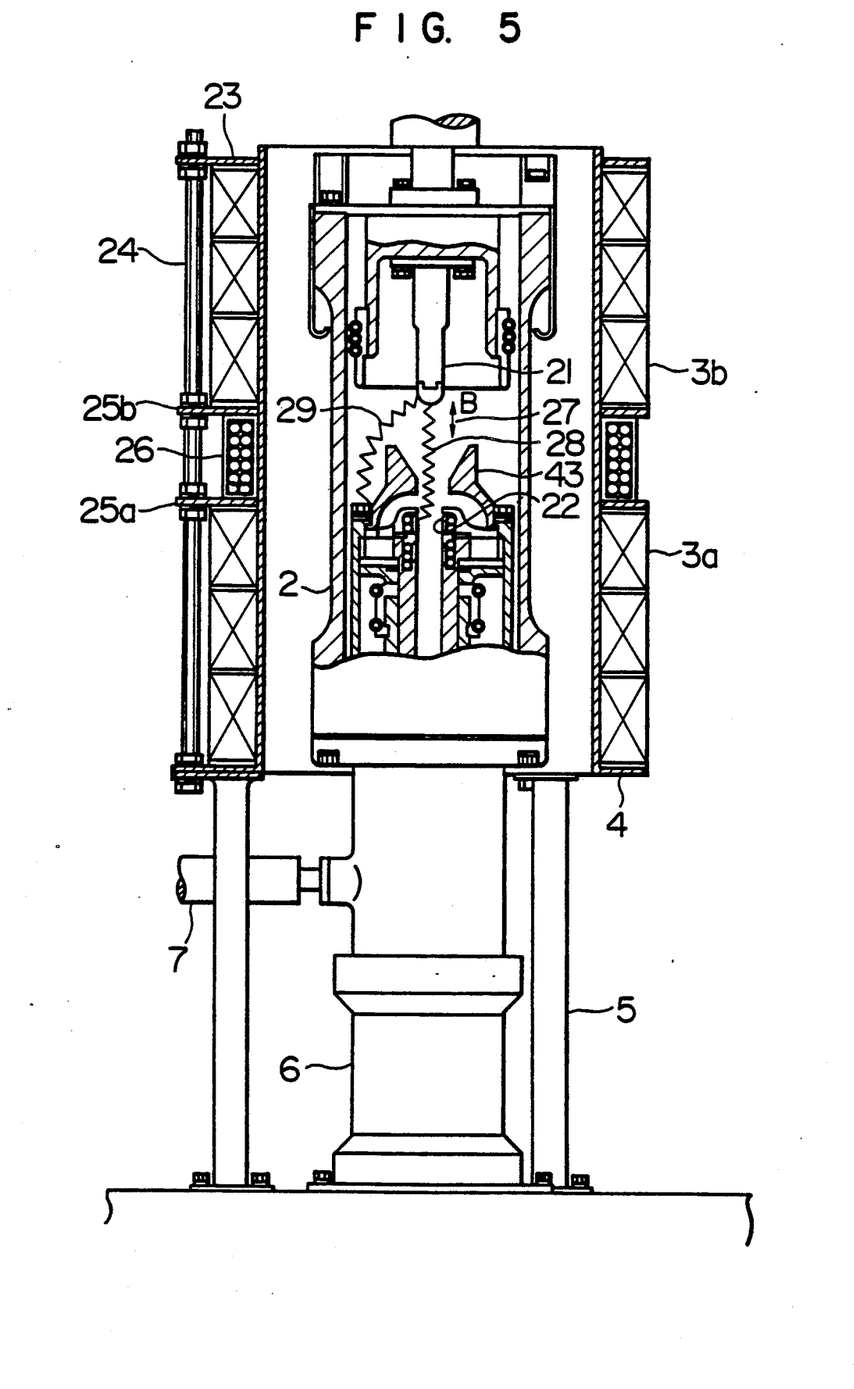
FIG. 5 is a front cross-sectional view of a modification of the breaker portion shown in FIG. 4.

FIG. 5 shows a modification of the breaker portion 2 for improving the arc-extinguishing power. The same members as shown in FIG. 4 are indicated with the same numerals, and different features only will be described hereinafter.

At the lower end of the line side current transformer 3b and at the upper end of the bus bar side current transformer 3a are arranged position adjusting plates 25b and 25a, respectively, which plates are fixed by means of bolts 24 for holding the current transformers 3a and 3b. Between the current transformers 3a and 3b is formed a space, where a coil 26 for generating magnetic field is disposed. High frequency electric current 33 is supplied to the coil 26, thereby generating a high frequency magnetic field 27. The inductance Lo of the coil 26 is given by the following equation:

$$Lo = (4/3\pi) \times (l/k') \times \{(k'/k)^2 \times (K-E) + E - k\}$$

where, r: radius of the magnetic field generating coil 26,
l: width of the winding coil 26, $$k = \sqrt{(2r/l)^2/\{(2r/l)^2 + 1\}}, \; k' = \sqrt{1-k^2}$$

$$K = \int_0^{\pi/2} (1/\sqrt{1 - k^2 \sin^2 \Phi}) \, d\Phi$$

$$E = \int_0^{\pi/2} \sqrt{1 - k^2 \sin^2 \phi} \, d\phi$$

Figure 6:
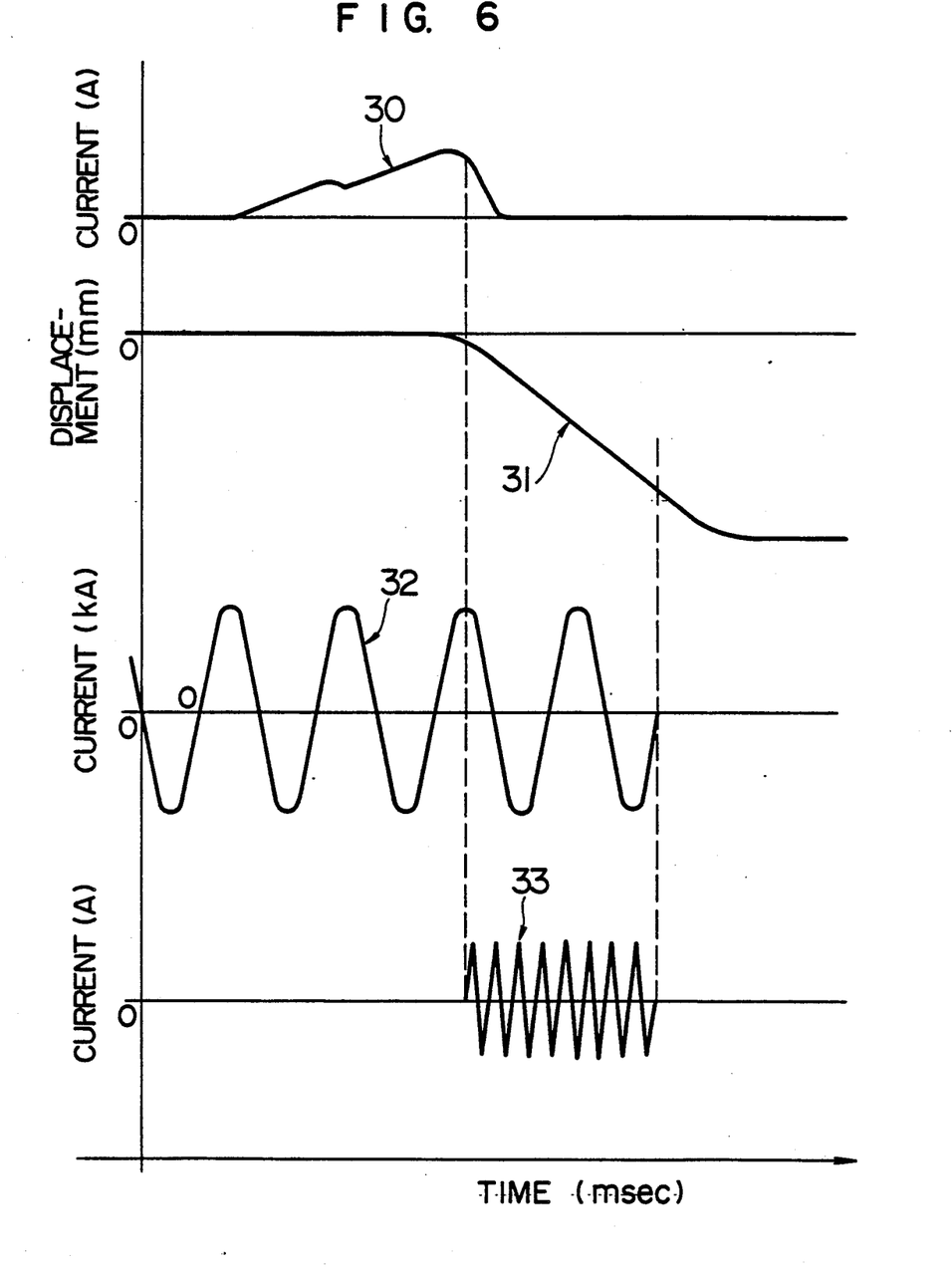
FIG. 6 is a graph for explaining the functions of the breaker portion shown in FIG. 4.

Referring to FIG. 6, when a break signal 30 is applied, the moving contactor 22 performs a circuit opening action as shown in a displacement curve 31. The high frequency electric current 33 is supplied to the coil 26 for generating the high frequency magnetic field between the poles of the breaker portion, thereby oscillating an arc 28 developed between contactors 21 and 22. The gas-extinguishing power is improved by applying this magnetic field in cooperation with by blowing a gas for extinguishing the arc. Thus, the electric current 32 is shut down as shown in FIG. 6. In addition, the high frequency magnetic field is effective for preventing any arc 29 from occurring in the outside of the insulation nozzle 43.

Figure 7:
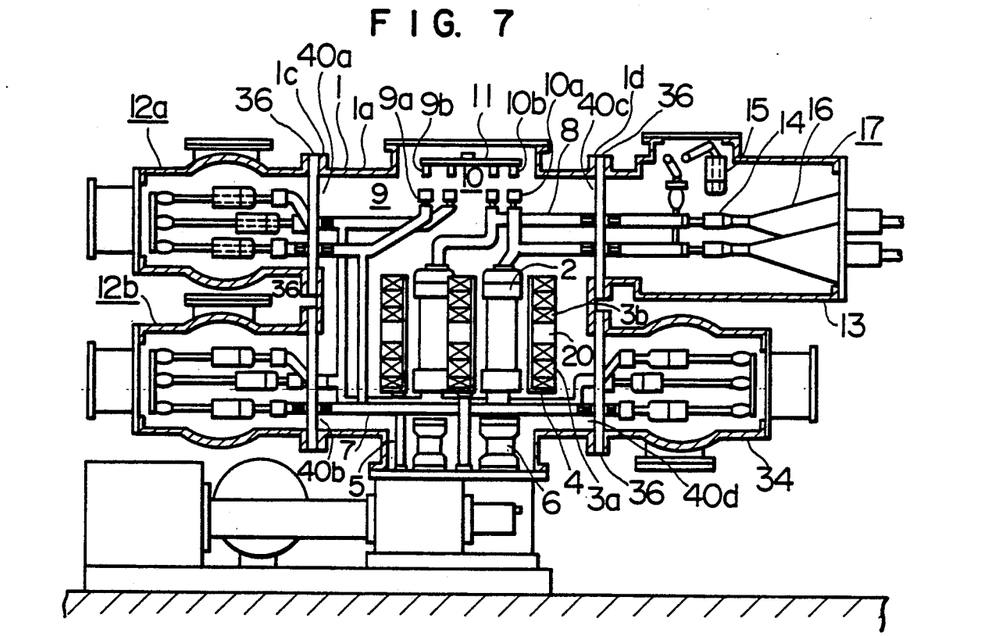
FIG. 7 is a front view of a gas-insulated switchgear apparatus according to a second embodiment of the present invention partially in section at the container portion for showing the internal arrangement.

FIG. 7 shows a gas-insulated switchgear apparatus according to a second embodiment of the present invention, which includes an additional bus bar 34, differently from in the first embodiment. The opening 40d, which has served as a manhole in the first embodiment, is connected with an additional bus bar 34. The line side terminal portion 17 is situated in a lateral direction in this embodiment.

In the second embodiment, the afore-mentioned advantages (1)–(5) can be also obtained, although the required mounting area becomes somewhat greater in comparison with the first embodiment.

Figure 8:
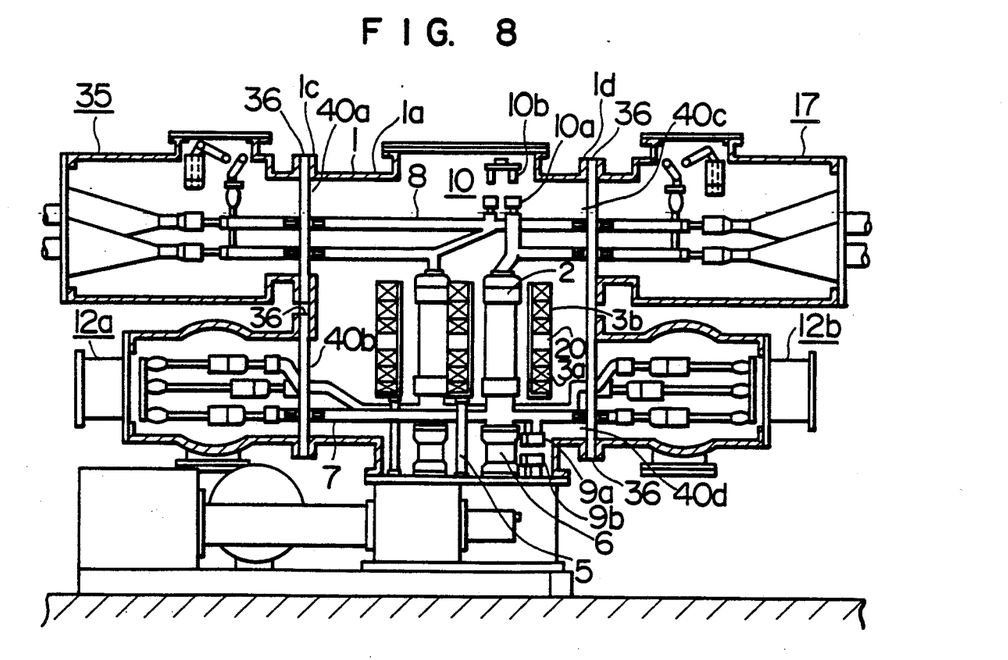
FIG. 8 is a front view of a gas-insulated switchgear apparatus according to a third embodiment of the present invention partially in section at the container portion for showing the internal arrangement.

FIG. 8 shows a gas-insulated switchgear apparatus according to a third embodiment of the present invention, where double bus bars and double line side terminal portions are arranged. The main bus bars 12a and 12b are connected through the openings 40b and 40d formed in the lower portions of the end plates 1c and 1d with the bus bar side connecting conductor 7 contained in the sealed container 1, which the conductor 7 is connected with the lower terminals of the breaker portions 2. Further, the bus bar side connecting conductor 7 has in the lower portion of the sealed container 1 a stationary contactor 9a, opposite to which is disposed a moving contactor 9b, these contactors constituting a bus bar side earthing switch 9. The line terminal portions 17 and 35 are connected through the openings 40a and 40c formed in the upper portions of the end plates 1c and 1d with the line side connecting conductor 8 contained in the sealed container 1, which the contactor 8 is connected with the upper terminals of the breaker portions 2. Further, the line side connecting conductor 8 has in the upper portion of the sealed container 1 a stationary contactor 10a, opposite to which is disposed a moving contactor 10b, these contactors constituting a line side earthing switch 10.

In this third embodiment, the height and the mounting area for the apparatus are substantially equal to those in the second embodiment, and the before-mentioned advantages (1)–(5) can be also obtained.

Figure 9:
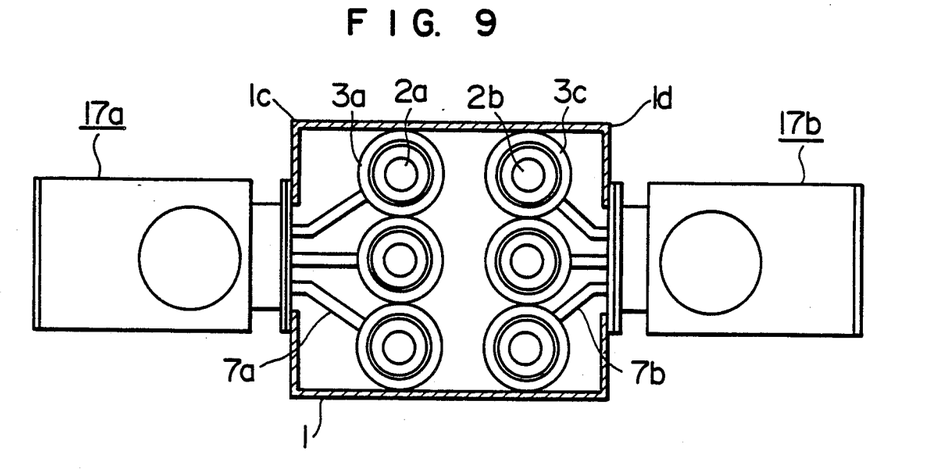
FIG. 9 is a plan view of the gas-insulated switchgear apparatus shown in FIG. 8 partially in section.
Figure 10:
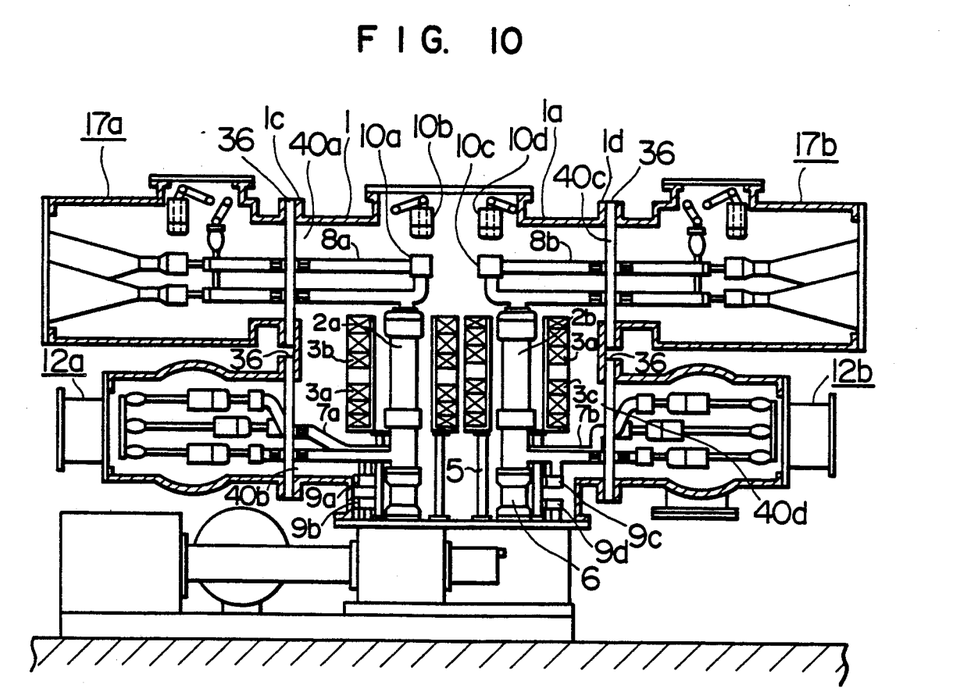
FIG. 10 is a front view of a gas-insulated switchgear apparatus according to a fourth embodiment of the present invention partially section for the container portion for showing the internal arrangement.
Figure 11:
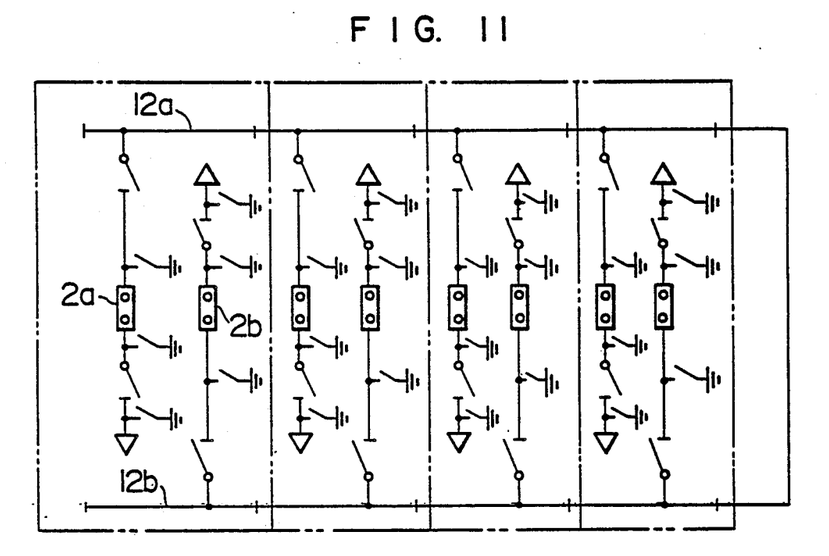
FIG. 11 is a circuit diagram of the gas-insulated switchgear apparatus shown in FIG. 10.

FIG. 9 and 10 show a gas-insulated switchgear apparatus according to a fourth embodiment of the present invention having a single line circuit shown in FIG. 11. In this embodiment, a gas-insulated switchgear apparatus includes two circuits: one circuit connected with the main bus bar 12a at its one end and with the line side terminal portion 17a at its other end, and the other circuit connected with the main bus bar 12b at its one end with the line side terminal portion 17b at its other end. In the sealed container 1, the breaker portions 2a and 2b corresponding to the two circuits and vertically acting for opening and closing area arranged in parallel. The line side connecting conductor 8a is connected at its one end with the line side terminal portion 17a through an upper opening 40a of the end plate 1c, and at its other end with the upper terminal of the breaker portion 2a. The bus bar side connecting conductor 7a is connected at its one end with the main bus bar 12a through a lower opening 40b of the end plate 1c, and at its other end with the lower terminal of the breaker portion 2a.

Further, the line side connecting conductor 8b is connected at its one end with the line side terminal portion 17b through an upper opening 40c of the end plate 1d, and at its other end with the upper terminal of the breaker portion 2b. The bus bar side connecting conductor 7b is connected at its one end with the main bus bar 12b through a lower opening 40d of the end plate 1d, and at its other end with the lower terminal of the breaker portion 2b.

Both the bus bar side connecting conductors 7a, 7b and both the line side connecting conductors 8a, 8b are provided with stationary contactors 9a, 9c and 10a, 10c, respectively, which constitute earthing switches in cooperation with the opposing contactors 9b, 9d and 10b, 10d. Around the breaker portions 2a and 2b, current transformers 3a, 3b and 3c, 3d are disposed as surrounding the breaker portions, respectively, similarly to in the before-mentioned embodiments.

In the fourth embodiment, the before-mentioned advantages (1)–(5) can be again obtained. Further, since two circuits are contained in a single gas-insulated switchgear apparatus, the required mounting area can be sharply decreased in comparison with in a case where separate apparatus are provided for every circuit.

Figure 12:
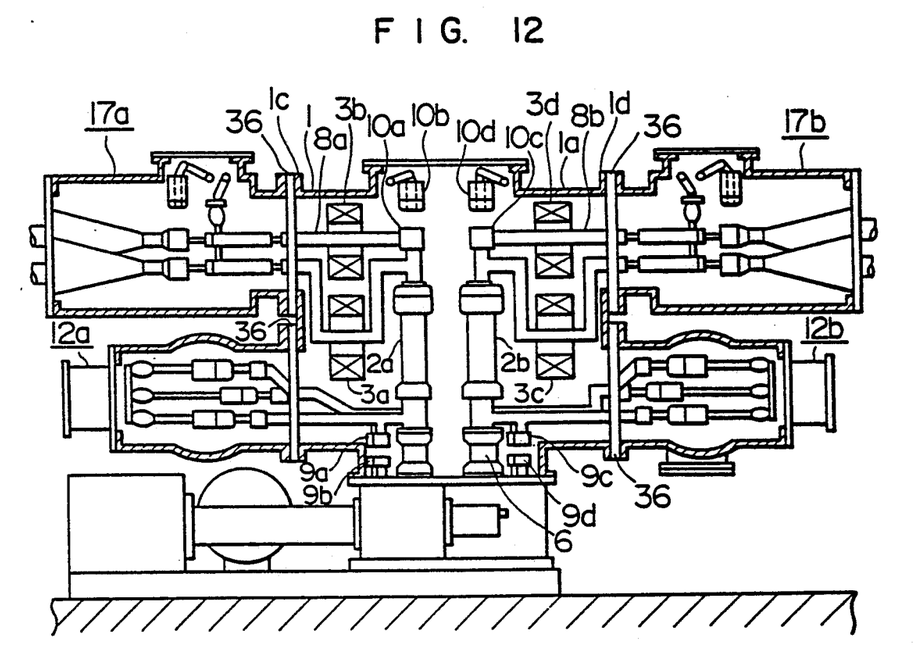
FIG. 12 is a front view of a gas-insulated switchgear apparatus according to a fifth embodiment of the present invention partially in section at the container portion for showing the internal arrangement.

FIG. 12 shows a fifth embodiment, a modification of the fourth embodiment, wherein each of current transformers 3a and 3b individually surrounds each of the connecting conductor 8a connecting upper terminals of one breaker portion 2a with the line side terminal portion 17a, and each of the current transformers 3c and 3d individually surrounds each of the connecting conductors 8b connecting upper terminals of one breaker portion 2b with the line side terminal portion 17b. Other constitutions are the same as in the fourth embodiment.

In the fifth embodiment, although the beforementioned advantages (4) and (5) can not be obtained, the mounting area is decreased in comparison with the fourth embodiment, because the breaker portions 2a and 2b can be arranged closer to each other by a distance corresponding to the space assumedly occupied by current transformers.

Figure 13:
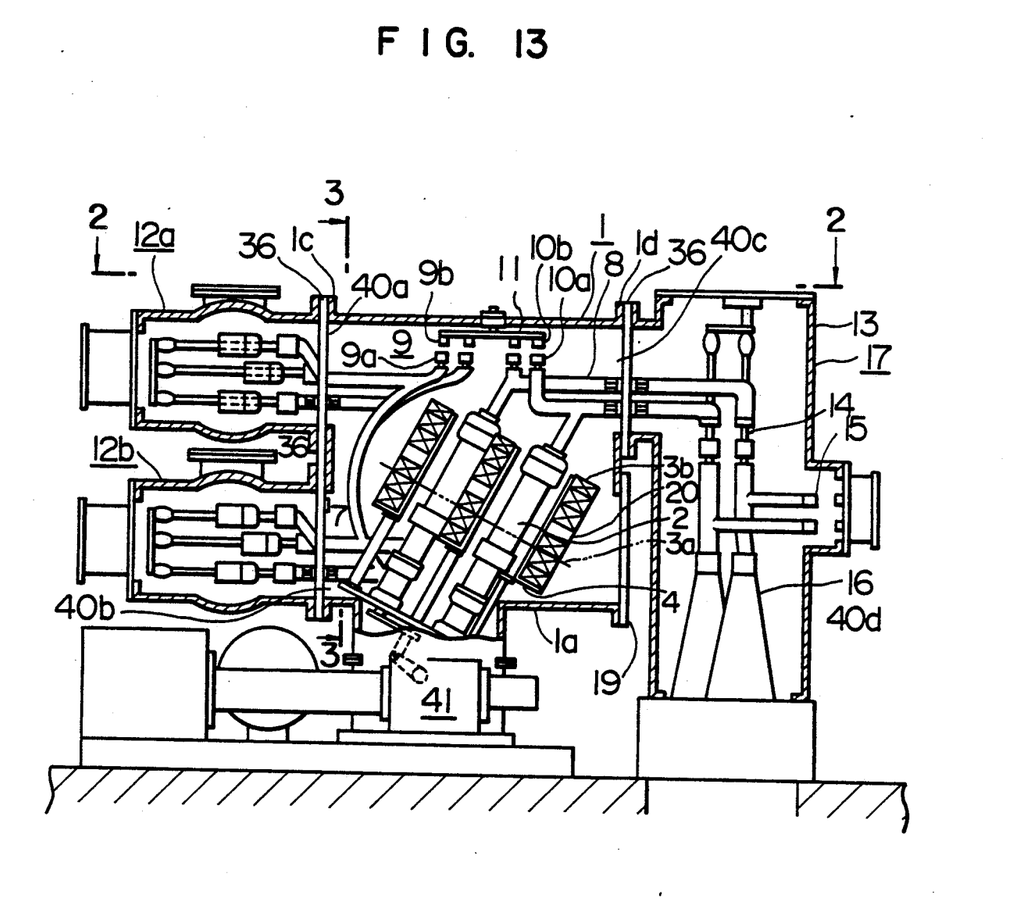
FIG. 13 is a front view of a gas-insulated switchgear apparatus according to a sixth embodiment of the present invention partially in section at the container portion for showing the internal arrangement.

FIG. 13 shows a gas-insulated switchgear apparatus according to a sixth embodiment of the present invention, a modification of the first embodiment, wherein the current transformers 3a and 3b surrounding the breaker portions 2 are so situated as inclined relative to a vertical line, In consequence, the length of the connecting conductor 7 connecting the main bus bar 12b with the lower terminal of the breaker portion 2 and the length of the connecting conductor 8 connecting the upper terminal of breaker portion 2 with the line side terminal portion 17 can be shortened.

As mentioned above, in a gas-insulated switchgear apparatus according to the present invention, the sealed container is of a cylindrical shape with its axis horizontal and its cross-section substantially circular; each end of the container is sealed by an end plate; and the main bus bar and the line side terminal portion are arranged on the side of the sealed container and connected with the breaker portion through the openings formed in the end plates, thereby requiring no branch nozzle to be connected with the main bus bar or the line side terminal portion. By virtue of this arrangement, a lower height and a narrower mounting area for a gas-insulated switchgear apparatus can be obtained. Further, the shapes of the connecting conductors contained in the sealed container can be made simple due to no existence of the magnetic field concentration on the earthing side, and the production of the sealed container is made easy.

What is claimed is:

1. A gas-insulated switchgear apparatus including a sealed container filled with arc-extinguishing gas and composed of a cylinder body and end plates for closing the end portions of said cylinder body and connected to main bus bars and line side terminal portions arranged on a main bus bar side and a line side of said sealed container, respectively, said sealed container accommodating therein breaker portions, current transformers, earthing switches, and connecting conductors; characterized in that:
    said sealed container is positioned with the axis thereof in a substantially horizontal direction;
    said connecting conductors are connected to said main bus bars and line side terminal portions through openings formed in said end plates; and
    said breaker portions are situated so as to perform connecting and disconnecting operations in the vertical direction; and
wherein:
    said current transformers are disposed so as to surround said breaker portions;
    a plurality of said current transformers are arranged on the main bus bar side of said sealed container and a plurality of said current transformers are arranged on the line side of said sealed container; and
    each of said current transformers on the main bus bar side is positioned with the upper end thereof located at substantially the same height as the height of a moving contact of one of said breaker portions in an open circuit condition of said one breaker portion, and each of said current transformers on the line side is positioned with the lower end thereof located at substantially the same height as the height of a stationary contact of said one breaker portion.

2. A gas-insulated switchgear apparatus according to claim 1, wherein a magnetic field generating coil is arranged between said main bus bar side current transformers and said line side current transformers.

3. A gas-insulated switchgear apparatus comprising:
    a sealed container filled with arc-extinguishing gas comprising a cylinder body and end plates having openings;
    breaker portions each having a movable contact and a stationary contact contained in said sealed container;
    current transformers comprising bus-side current transformers and line-side current transformers contained in said sealed container;
    earthing switches each having a movable contact and a stationary contact contained in said sealed container; and
    connecting conductors comprising bus-side connecting conductors and line-side connecting conductors contained in said sealed container;
wherein:
    said sealed container is disposed so that an axis of said cylinder body extends in a substantially horizontal direction;
    said bus-side and line-side connecting conductors are respectively connected through the openings formed in said end plates to main bus bars and line-side terminal portions, said main bus bars and said line-side terminal portions arranged on sides of said sealed container; and
    said breaker portions are arranged so as to perform connecting and disconnecting operations in a substantially vertical direction.

4. A gas-insulated switchgear apparatus according to claim 3, wherein said current transformers are disposed so as to surround said breaker portions.

5. A gas-insulated switchgear apparatus according to claim 4, wherein the height of the upper end of said bus-side current transformers is substantially the same as the height of the movable contacts of said breaker portions in an opened condition thereof, and the height of the lower end of said line-side current transformers is substantially the same height as the height of the stationary contacts of said breaker portions.

6. A gas-insulated switchgear apparatus according to claim 5, wherein a magnetic field generating coil is arranged between said bus-side current transformers and said line-side current transformers.

7. A gas-insulated switchgear apparatus according to claim 3, wherein one of the openings formed in said end plates is a manhole that is sealed by a lid for allowing maintenance and inspection.

8. A gas-insulated switchgear apparatus according to claim 3, wherein said earthing switches include a bus-side earthing switch and a line-side earthing switch, said bus-side earthing switch and said line-side earthing switch each further comprising a plurality of stationary contacts and a plurality of movable contacts, and wherein said bus-side connecting conductors are connected to said stationary contacts of said bus-side earthing switch and said line-side connecting conductors are connected to said stationary contacts of said line-side earthing switch and movable contacts of said bus-side and line-side earthing switches located opposite said stationary contacts of said bus-side and line-side earthing switches are mounted on a common supporting plate.

9. A gas-insulated switchgear apparatus according to claim 3, wherein:

said breaker portions, said main bus bars and said line-side terminal portions are each respectively two in number;

a first one of said breaker portions is used for a first single line circuit with one end thereof connected to a first one of said main bus bars and with the other end thereof connected to a first one of said line-side terminal portions, and a second one of said breaker portions is used for a second single line circuit with one end thereof connected to a second one of said main bus bars and with the other end thereof connected to a second one of said line-side terminal portions.

* * * * *